United States Patent [19]
Robinson

[11] 4,161,813
[45] Jul. 24, 1979

[54] METHOD OF STRING ATTACHING TO GAME RACKET HANDLE

[75] Inventor: Mark L. Robinson, Andover, Mass.

[73] Assignee: Acro, Inc., Stoneham, Mass.

[21] Appl. No.: 878,087

[22] Filed: Feb. 15, 1978

Related U.S. Application Data

[63] Continuation-in-part of Ser. No. 800,660, May 26, 1977, abandoned.

[51] Int. Cl.² ............................ B23P 3/00; B23P 19/04
[52] U.S. Cl. .................................. 29/460; 29/526 R; 264/261; 264/277
[58] Field of Search ..................... 29/458, 526 R, 460; 264/261, 277, 328; 273/73 J, 73 H, 75, 67 B, 67 C, 81 R, 81 D, 84 R

[56] References Cited
U.S. PATENT DOCUMENTS

| | | | |
|---|---|---|---|
| 1,583,309 | 4/1926 | Reach | 273/73 J UX |
| 1,909,932 | 5/1933 | Digel | 273/84 R |
| 3,400,446 | 9/1968 | Yulkowski | 264/261 X |
| 3,582,073 | 6/1971 | Melnick | 273/73 J |
| 3,612,526 | 10/1971 | Bruill | 273/73 J X |
| 3,664,668 | 5/1972 | Held | 273/75 |
| 3,702,701 | 11/1972 | Vaughn et al. | 273/73 J X |

*Primary Examiner*—Charlie T. Moon
*Attorney, Agent, or Firm*—Charles Hieken

[57] ABSTRACT

A pin is connected between the two legs of the game racket frame in the handle portion near the end. This assembly is placed in a mold with an insert between the legs abutting the pin and initially effectively blocking any string from being looped around the pin and emerging through the bottom of the handle portion. Handle molding material is introduced into the mold to form the handle. The material around the pin is then routed out forming a channel open at the bottom of the handle portion for receiving the handle string that may be readily looped about the pin.

7 Claims, 8 Drawing Figures

METHOD OF STRING ATTACHING TO GAME RACKET HANDLE

REFERENCE TO PRIOR COPENDING APPLICATION

This is a continuation-in-part application of application Ser. No. 800,660 filed May 26, 1977, now abandoned.

BACKGROUND OF THE INVENTION

The present invention relates in general to string attaching and more particularly concerns novel apparatus and techniques for attaching a racket ball handle string to a racket ball racket resulting in what is believed to be the lightest strongest racket ball handle on the market of relatively simple structure and relatively easy and inexpensive to manufacture.

A racket ball racket essentially comprises a handle portion separated from the head portion by a short throat portion and a playing rope or handle string attached to the handle portion forming a loop through which the player passes his hand and forearm before gripping the handle. During play significant forces pull on the playing rope, presenting problems of effecting a secure attachment to the frame. The prior art approach included the following three ways of attaching the playing rope to the racket ball handle attached to, but no part of, the original frame.

(1) Molding an eye to the bottom cap of the handle.

(2) Drilling a large hole in the bottom of the handle and driving a small pin through one side of the handle perpendicular to and through the large hole and into the opposite side.

(3) Molding an eye into the bottom cap with a side action mold.

Each of these approaches involves attachment to some form of end piece that then must be firmly secured to the frame because during play the playing rope approaches great forces on these end pieces to which they are attached.

Accordingly, it is an important object of this invention to provide improved methods and means for attaching a handle string or playing rope to a racket ball racket.

It is a further object of the invention to achieve the preceding object while providing a handle that is exceptionally strong, exceptionally lightweight, relatively free from complexity, relatively easy and inexpensive to manufacture and enhances the racket strength.

It is a further object of the invention to achieve one or more of the preceding objects with techniques that facilitate positive center location for the handle eliminating askew handles.

SUMMARY OF THE INVENTION

According to the invention, in a game racket frame having opposed legs in a handle portion, pin means is connected between the opposed legs in the handle portion near the end, the handle portion further comprising lightweight material, such as plastic, between and around the legs formed with a cavity extending into the handle portion from its end to just past the pin means for accommodating a playing rope looped around the pin means and extending out the end of the cavity.

According to the invention, the pin means is inserted through both frame legs in the handle portion near the end and material placed between and around the legs in the handle portion, a portion of this material being removed to form the cavity. Preferably, the material is plastic. Preferably an insert is centered in a mold and the pinned legs moved into the mold with the plastic insert between them and abutting against the pin. The mold, shaped to conform to the desired handle shape, is then filled with plastic that is allowed to harden, and the assembly removed from the mold.

Numerous other features, objects and advantages of the invention will become apparent from the following specification when read in connection with the accompanying drawing in which:

DETAILED DESCRIPTION OF PREFERRED EMBODIMENTS

Figure 1:
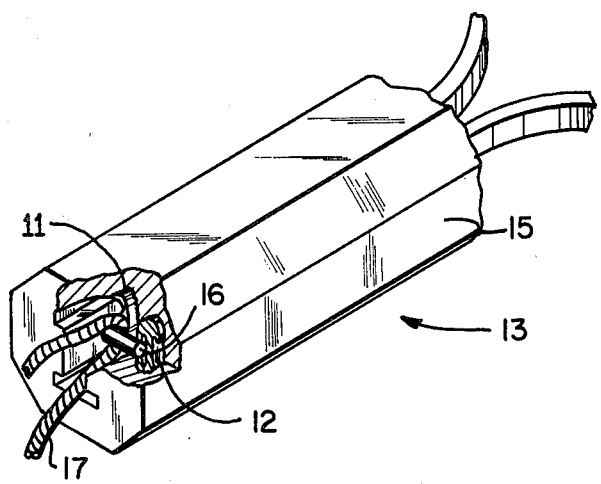
FIG. 1 is a perspective view of an embodiment of the invention with a portion cut away to illustrate the handle string around the pin.

With reference now to the drawing and more particularly FIG. 1 thereof, there is shown a perspective view of an embodiment of the invention with a portion cut away to better illustrate the relationship among the structure and the playing rope. The racket ball racket comprises an aluminum extrusion shaped in the form of a racket having opposed legs 11 and 12 in handle portion 12 and surrounded by molded plastic material 15. A pin 16 inserted through opposed legs 11 and 12 supports playing rope or handle string 17 securely and helps reinforce the racket frame comprising legs 11 and 12 to provide some rigidity to racking by forming a structural element in the frame itself. A cavity 18 is formed in the end of the handle portion 13 for exposing pin 16 and allowing playing rope 17 to be looped thereover.

Figure 2:
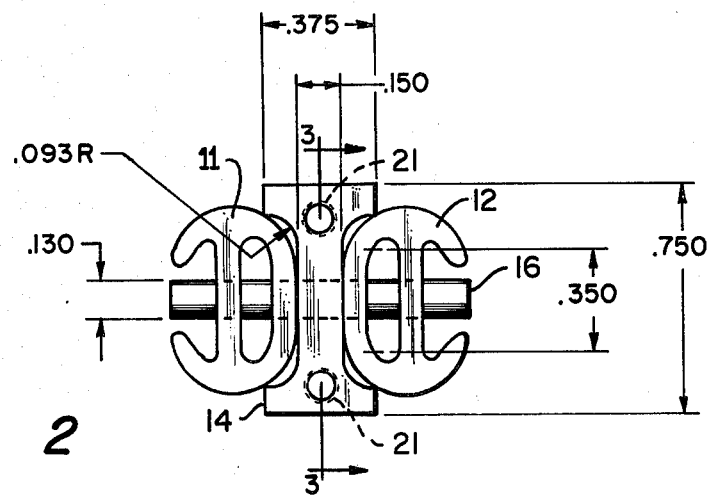
FIG. 2 is an end view showing the assembly of opposed legs, pins and insert during assembly according to the invention.

Referring to FIG. 2, there is shown an end view of the opposed legs 11 and 12, pin 16 seated therein and aluminum insert 14 formed with tapped openings 21 for receiving machine screws for securing to the mold base.

Figure 3:
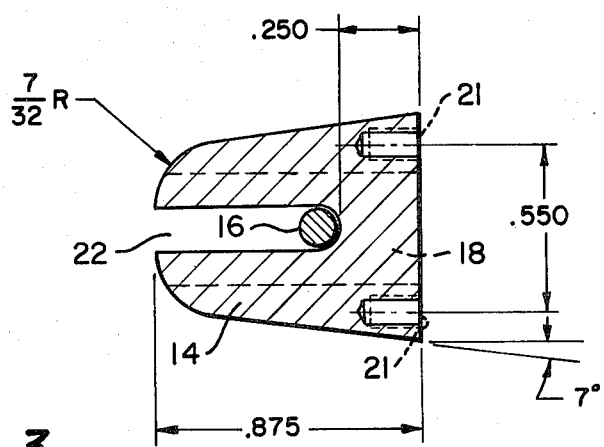
FIG. 3 is a sectional view along section 3—3 of FIG. 1 showing the plastic insert abutting the pin.

Referring to FIG. 3, there is shown a sectional view through section 3—3 of FIG. 2 illustrating how aluminum insert 14 is formed with a slot 22 for accommodating pin 16 in the center. In accordance with a feature of the invention aluminum insert 14 may be fastened in centered relationship to the bottom of a mold, and legs 11 and 12 positioned in the mold with pin 16 entering slot 22 to the end to center the legs and pin assembly in the mold and insure a symmetrical handle. Plastic may then be poured into the mold to form the surrounding plastic portions 15. When the plastic has hardened, the portions inside slot 22 may be routed to form the remainder of cavity 18, typically with a tool resembling a crocheting needle.

FIGS. 2 and 3 show specific exemplary dimensions of an exemplary embodiment of the invention. Plastic 15 is typically lightweight and may be wrapped with a tape and has adequate strength in compression. Its final density is preferably 20 pounds/ft.$^3$ and may be in the range from 6 to 40 pounds/ft.$^3$. Since playing rope 17 is not mechanically connected to the frame through the plastic portions, these plastic portions need not have appreciable tensile strength and may be relatively lightweight. The result of this arrangement is a light strong handle that is relatively easy and inexpensive to fabricate while firmly securing the playing rope 17 to the racket frame.

Figure 4:
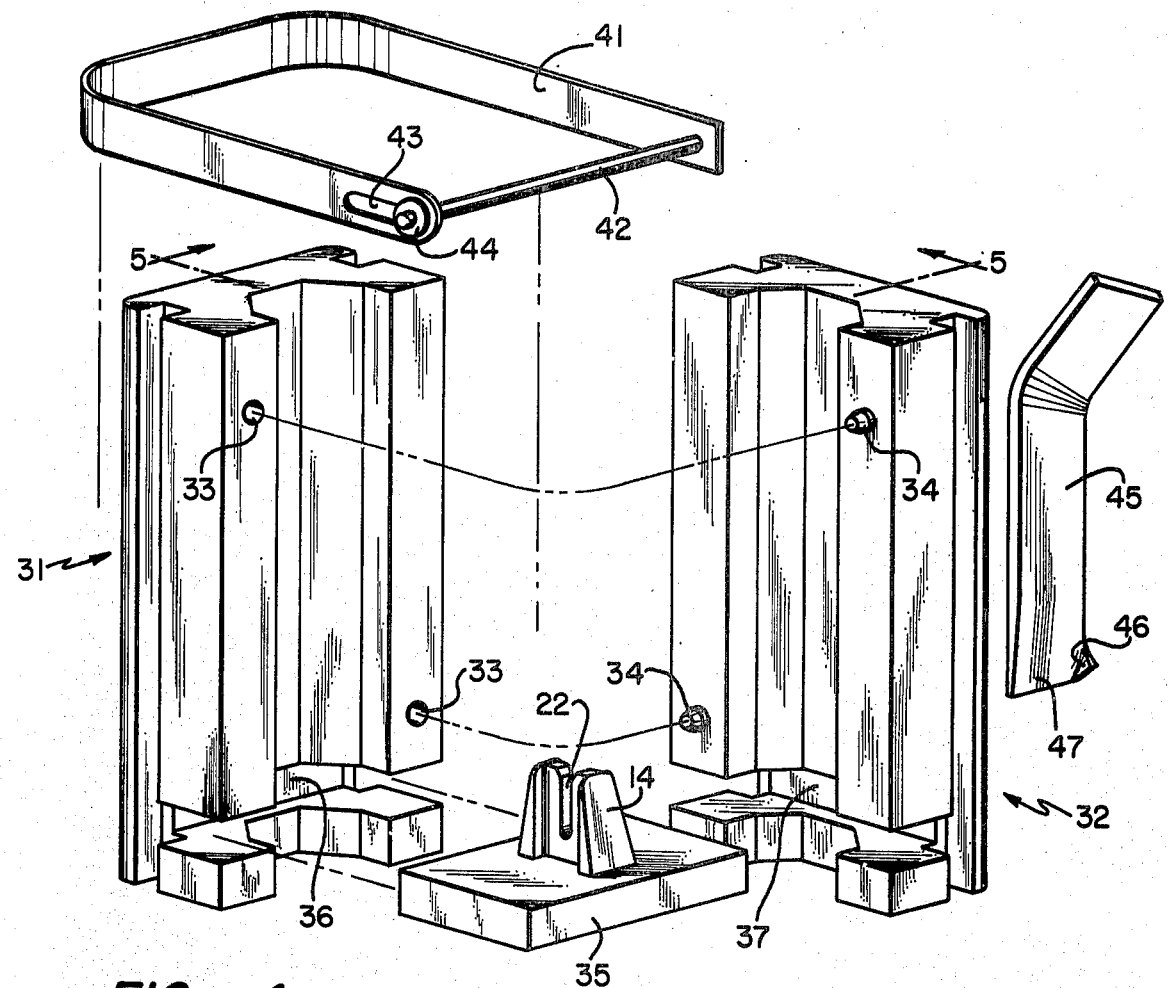
FIG. 4 is an exploded view of a preferred form of mold for practicing the invention.

Referring to FIG. 4, there is shown an exploded view of a preferred form of mold assembly. The mold may be made of aluminum and includes essentially symmetrical left and right portions 31 and 32, respectively. Left section 31 is formed with openings 33 for mating relationship with pins 34 on right section 32. Aluminum insert 14 is screwed to slidable base 35 that is free to move in the slotted region 36 and 37 of left sections 31 and 32, respectively, to facilitate centering as described above.

A clamping mechanism comprising U-shaped rod 41 carrying a rotatable rod 42 free to slide at one end in slot 43 carrying washer 44 and camming lever 45 formed with an upwardly turned corner 36 and tapered at the end 47 functions to clamp left and right sections 31 and 32 together.

Figure 5:
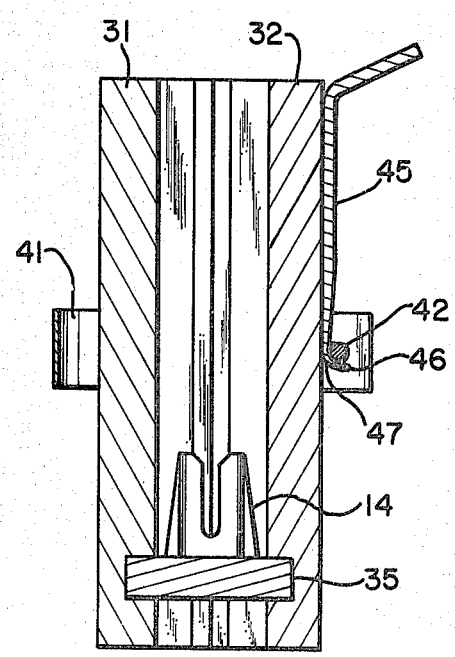
FIG. 5 is a sectional view through section 5—5 of FIG. 4 of the assembled mold.

Referring to FIG. 5, there is shown a view through section 5—5 of FIG. 4 of the assembled unit.

To operate the mold, left sections 31 and 32 are fitted together. The clamping assembly comprising U-shaped member 41 and rod 42 are slipped over sections 31 and 32. Point 46 of camming lever 45 is then placed between rod 42 and right section 32 and camming lever 45 then rotated around the axis of rod 42 while urged downward to wedge rod 42 away from right section 32 and thereby firmly clamp sections 31 and 32 together. Removal is easily accomplished by rotating camming lever 45 about point 46 whereupon the clamping assembly drops down and may be easily removed. Sections 31 and 32 may then be separated to release the molded handle.

Figure 6:
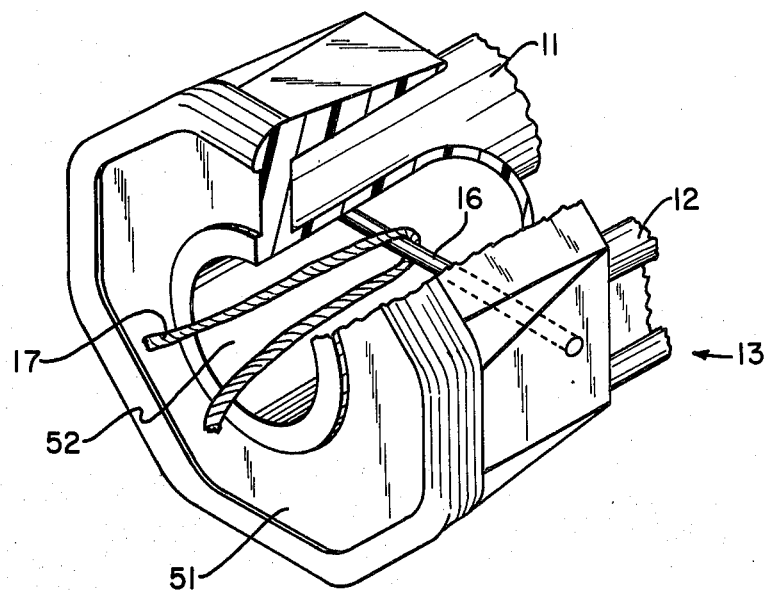
FIG. 6 is a perspective view of another embodiment of the invention in which the pin passes through a cup-shaped recess in an end cap.

Referring to FIG. 6, there is shown a perspective view of another embodiment of the invention with a portion cut away to better illustrate the relationship among the playing rope and other structural elements. The racket ball racket comprises an aluminum extrusion shaped in the form of a racket having opposed legs 11 and 12 in handle portion 13 and surrounded by molded plastic material 15 and end cap 51. A pin 16 inserted through opposed legs 11 and 12 and end cap 51 supports playing rope or handle string 17 securely and helps reinforce the racket frame comprising legs 11 and 12 to provide some rigidity to the racket by forming a structural element in the frame itself. A cup-shaped cavity or recess 52 formed in end cap 51 exposes pin 16 and allows playing rope 17 to be looped thereover.

Figure 7:
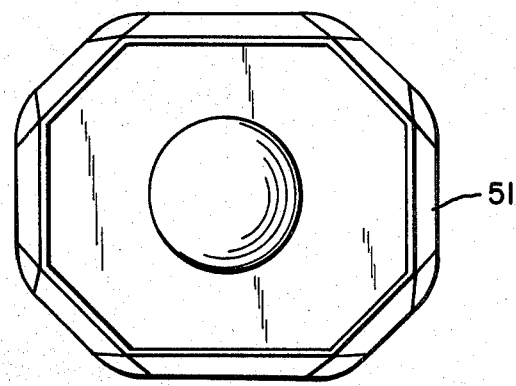
FIG. 7 is an end view of the embodiment of FIG. 6.

Referring to FIG. 7, there is shown a bottom view of the bottom cap 51 which fits over the racket handle portion 13.

Figure 8:
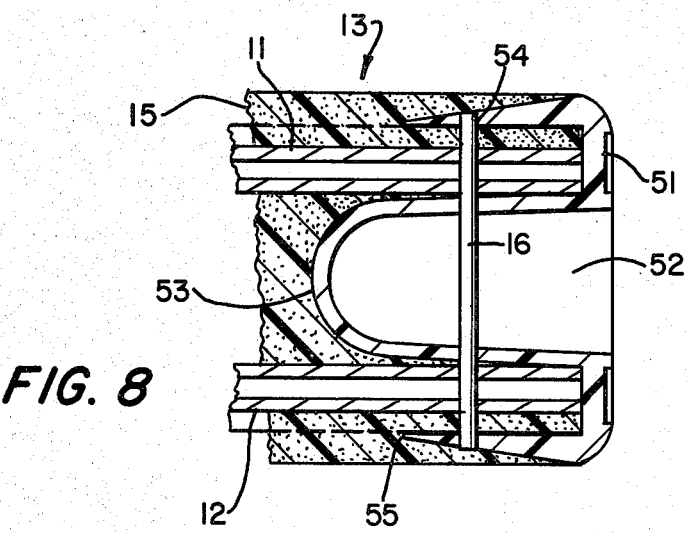
FIG. 8 is a sectional view through section 8—8 of FIG. 7.

Referring to FIG. 8, there is shown a sectional view through section 8—8 of FIG. 7 illustrating how bottom cap 51 fits over racket handle portion 13. In accordance with a feature of the invention the racket may be prepared as described above up through inserting the pin. Although, now a pin, which may be screw or rivet, is inserted about 1½ to 2 inches up the legs with or without a spacer between the legs at this point. The space between legs 11 and 12 is then filled with hardened plastic. A hole is drilled in the center of this plastic-filled space at the end of the racket handle for receiving protrusion 53 (the outside of cavity 52) or bottom cap 51. This drilling may remove some aluminum and plastic while leaving enough aluminum to facilitate securely fastening end cap 51 to handle portion 13 of the frame. The bottom cap 51 is now pressed onto the end of the racket handle 13 snug against the base. A small hole 54 is then drilled through the bottom cap 51, molded plastic 15, and opposed legs 11 and 12 down to approximate location 55. The pin 16 is pressed into hole 54 through end cap 51, cavity 52 and opposed legs 11 and 12, thereby providing a secure purchase for playing rope 17.

As an alternative method of manufacture the step of drilling along the handle axis may occur before the handle is placed in the mold. Any forming method may be used to move metal out of the space where the cap is to be attached, even while the frame is straight. Also then the insert 14 in the mold could be made to the protrusion shape to again centrally locate the handle in the mold, or the end cap could be part of the mold. The end base 51 is then seated in the mold, the handle portion 13 placed in the mold with protrusion 53 seated in the opening drilled along the handle axis. Plastic material is then poured into the mold and allowed to harden. The mold is removed, and hole 54 drilled in the manner described above. If the opposed handle portions 11 and 12 are separated by a distance at least equal to the diameter of protusion 53, the step of drilling along the handle axis may be omitted.

Pin 16 is preferably 3/16 to 1 inch from the end of handle 13 and may be a rivet or screw. A spacer may or may not be inserted between legs 11 and 12.

The advantage of this alternative method is that it allows for higher drilling and clamping forces because there is no plastic to be damaged. It also allows for better alignment between the handle exterior and the protrusion because as the handle sizes change, any drilling fixture would have to be adjusted to compensate for a new center distance whereas when working with the frames, they are always the same size. Additionally, any misdrilling at this stage would be compensated for by the racket piloting onto the insert slightly askew, but in the molding the hole would end up centered in the handle.

There has been described novel apparatus and techniques for securing a playing rope to a racket ball racket economically, reliably and securely while providing a strong lightweight handle and frame of improved rigidity. It is apparent that those skilled in the art may now make numerous uses and modifications of and departures from the specific embodiments described herein without departing from the inventive concepts. Consequently, the invention is to be contrued as embracing each and every novel feature and novel combination of features present in or possessed by the apparatus and techniques herein disclosed and limited by the spirit and scope of the appended claims.

I claim:

1. A method of making the game racket handle of a game racket having a frame with a handle portion comprising opposed legs, pin means connected between said opposed legs in said handle portion near the end thereof for accommodating a handle string looped thereover, said handle portion comprising additional material between and around said opposed legs and formed with a cavity extending from the end of said handle portion to slightly beyond said pin means for accommodating said handle string, which method includes the steps of, inserting said pin means through said opposed legs near the end of said end portion, and inserting initially flowable material between said opposed legs leaving a cavity extending between said legs from the end of the handle portion to slightly beyond the pin means for accommodating a handle string in said handle portion.

2. A method in accordance with claim 1 and further including the steps of, placing initially flowable material around said opposed legs and pin means, and routing said material to form said cavity.

3. A method in accordance with claim 2 and further including the step of looping a handle string around said pin means.

4. A method in accordance with claim 1 and further including the steps of assembling sections of a mold together formed with an opening corresponding to the shape of said handle portion, placing a clamp over the mold sections having a rod seated in opposed legs, and urging the rod away from the mold by inserting a cam lever formed with a turned-up corner adjacent to a tapered edge by inserting the tapered corner between the rod and the mold and rotating the cam lever about the turned-up corner to firmly clamp the mold sections together.

5. A method in accordance with claim 4 and further including the step of placing an insert in the base of said mold formed with a slot for accommodating said pin means and centering said insert in said cavity.

6. A method of making the game racket handle of a game racket having a frame with a handle portion comprising opposed legs, pin means connected between said opposed legs in said handle portion near the end thereof for accommodating a handle looped thereover, said handle portion comprising additional material between and around said opposed legs and formed with a cavity extending from the end of said portion to slightly beyond said pin means for accommodating said handle string, which method includes the steps of, inserting a cap means formed with a protrusion in said cavity open at the end of said handle portion, inserting initially flowable material between said opposed legs and said cap means leaving a cavity extending between said legs from the end of the handle portion to slightly beyond the pin means for accommodating a handle string, and inserting said pin means through said cap means and said opposed legs near the end of said handle portion.

7. A method in accordance with claim 6 and further including the steps of, placing said handle portion in a mold, and forming an opening in the center of the bottom of said handle means to accommodate said cap means.

* * * * *